March 23, 1943.  O. B. MOORE ET AL  2,314,726
APPARATUS FOR TREATING TIRES
Filed Nov. 23, 1940  7 Sheets-Sheet 1

INVENTORS
OSBORNE B. MOORE
GLENN G. HAVENS
BY GEORGE F. WIKLE
ATTORNEY

March 23, 1943.	O. B. MOORE ET AL	2,314,726
APPARATUS FOR TREATING TIRES
Filed Nov. 23, 1940	7 Sheets-Sheet 4

INVENTORS
OSBORNE B. MOORE
GLENN G. HAVENS
BY GEORGE F. WIKLE
ATTORNEY

March 23, 1943. O. B. MOORE ET AL 2,314,726
APPARATUS FOR TREATING TIRES
Filed Nov. 23, 1940    7 Sheets-Sheet 5

INVENTORS
OSBORNE B. MOORE
GLENN G. HAVENS
BY GEORGE F. WIKLE
ATTORNEY

Patented Mar. 23, 1943

2,314,726

UNITED STATES PATENT OFFICE 2,314,726

APPARATUS FOR TREATING TIRES

Osborne B. Moore and Glenn G. Havens, Detroit, and George F. Wikle, Grosse Pointe, Mich., assignors to United States Rubber Company, New York, N. Y., a corporation of New Jersey Application November 23, 1940, Serial No. 366,812

14 Claims. (Cl. 18—2)

This invention relates to an apparatus for treating pneumatic tires and, in particular, to an apparatus for heat treating the bases of tread grooves of pneumatic tires. Further, the invention contemplates a machine including inter-related mechanisms which function automatically in the handling and treatment of tires.

The invention contemplates the treatment of tires according to the method disclosed in U. S. Patent No. 2,110,224, dated March 8, 1938, and to the resulting product as disclosed in U. S. Patent No. 2,110,225 dated March 8, 1938.

In general, the invention comprises means for supporting a pneumatic tire on a vertical axis; means for centering the tire on its support; means for clamping the tire for distending the tread grooves; and means for moving the tire vertically into an operative position with devices for directing a relatively high temperature against the distended tread grooves of the tire.

In order to obtain efficient treatment of tires, a localized high temperature treatment is desired, and such high temperatures must function to produce the desired results in the tire without burning or otherwise causing a detrimental effect in the rubber composition. To accomplish this, we provide heating means supplying super heated steam directed toward the region at the base of the tread grooves. This super heated steam is generated when steam is passed through a narrow opening containing electrically heated elements located in the proximity of the bases of the tread grooves.

After a predetermined heat treating period, the tire is moved vertically into a position in which water is directed against the tread grooves for the purpose of cooling the rubber composition and for setting the rubber in a definite condition without the strains which were relieved by the heat treatment. The cooling operation is performed while the tire still remains in a clamped position. Upon completion of the cooling operation, the tire clamping means are separated, and the tire is removed manually from the machine. From the time the tire is inserted into the machine until it is removed therefrom, all of the operations are automatic and timed in sequence to conform to the successive stages of treatment of the tire.

The apparatus of the present invention is primarily concerned with the treatment of tires having a tread pattern which includes circumferentially extending grooves, and it is to be understood that one or more or all of the grooves of a tire may be treated simultaneously.

Among the objects of our invention are to provide an apparatus for treating the base regions of pneumatic tire tread grooves in an automatic and efficient manner to produce accuracy and uniformity of treatment; and to provide a pneumatic tire, the active life of which is increased by this treatment. These and other objects and advantages appear more fully in the following detailed description when considered in connection with the accompanying drawings, in which.

Figure 2:
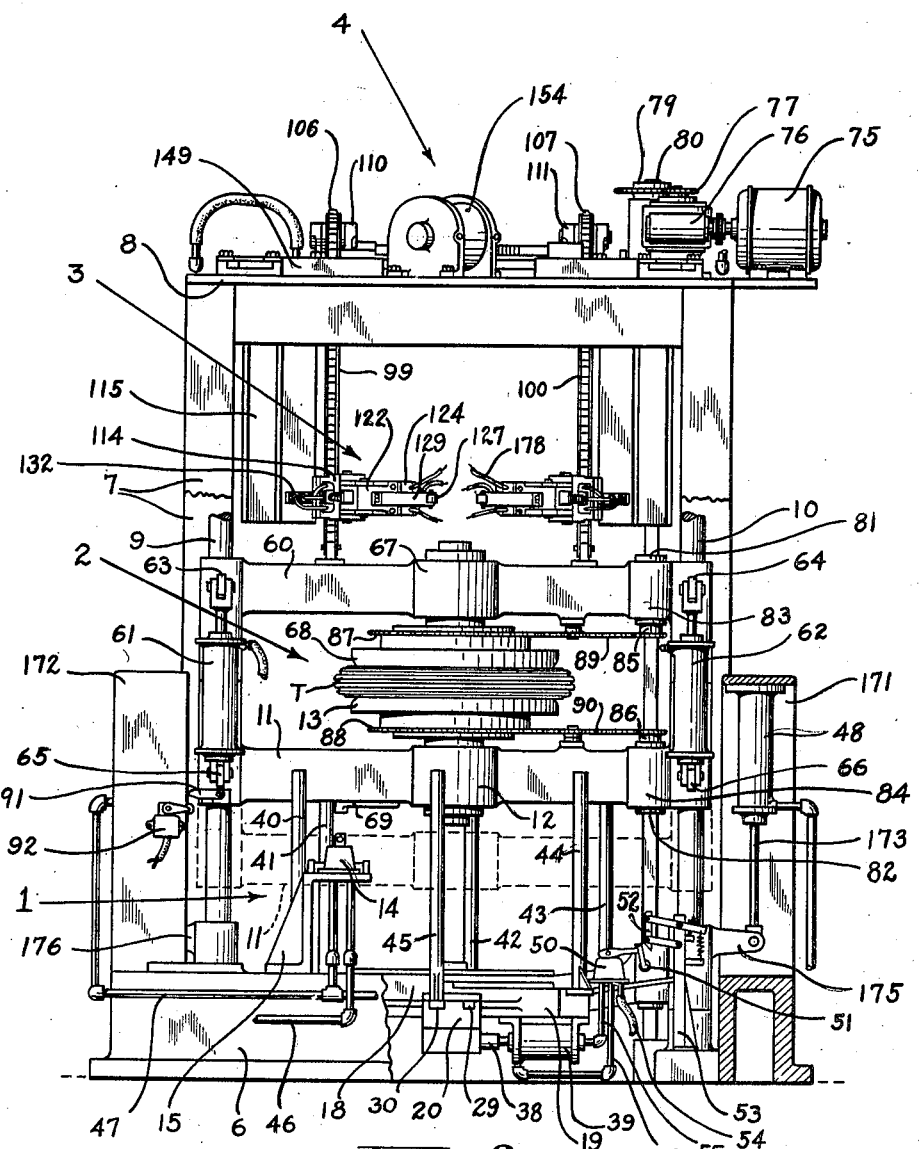
Fig. 2 is a front elevational view thereof, partly in section.

Referring to the drawings and, in particular, to Fig. 2, we show general subdivisions of the principal units of an apparatus including a tire centering device defined by the numeral 1, a tire clamping mechanism 2, a series of heating units 3, and heating unit control mechanism 4. The supporting structure of the machine comprises a base member 6, vertical columns 7, and a top plate member 8. Rigidly mounted on the base member 6 and secured to the top plate member 8 are shafts 9 and 10 located centrally between the side vertical columns 7. Slidably mounted on the shafts 9 and 10 is a cross member 11 which in its initial position is shown by the dash line illustrated in Fig. 2. Centrally located in the cross member 11 is a bearing housing 12 which rotatably supports a tire supporting flange 13 in a vertical axis. When the supporting flange 13 is in its receptive position, an operator manually places a tire T thereon and operates a control valve 14 mounted on a bracket 15 supported by the base member 6, thus starting the machine through a series of operations automatically performed thereafter. The operator merely locates the tire in an approximate central position on the supporting flange 13, after which it is automatically centered.

Figure 5:
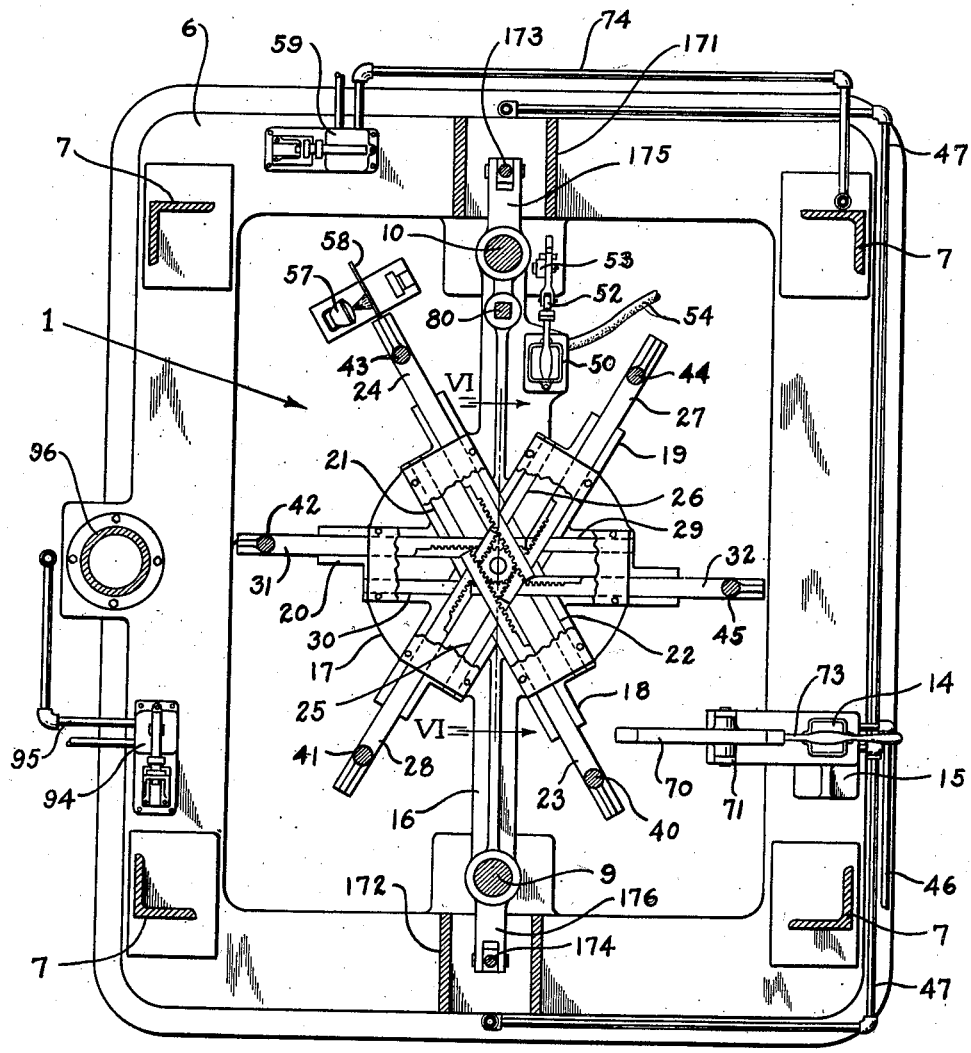
Fig. 5 is a plan view of the machine shown in Fig. 1, partly in section, taken on the line V—V of Fig. 3, depicting a tire centering mechanism.

Referring to Figs. 2 and 5, there is shown a tire centering device, designated by the numeral 1, comprising a spider member 16 slidably mounted on the vertical shafts 9 and 10. Located in the center of the spider member 16 is a hub 17 (Fig. 5) having projecting portions 18, 19, and 20 radiating therefrom and equidistant from each other. The projecting portion 18 has slots 21 and 22 cut therein to receive sliding rack members 23 and 24, respectively. In a similar manner the projecting portion 19 has slots 25 and 26 cut therein to receive sliding rack members 27 and 28, respectively. The projecting portion 20 likewise contains slots 29 and 30 for sliding rack members 31 and 32, respectively. The above mentioned slots cut in the projecting portions 18, 19 and 20 are of different depths, that is, the slots 25 and 26 are of greater depth than slots 21 and 22, and slots 29 and 30 are of still greater depth than slots 25 and 26. The varied depth of the slots is provided to permit simultaneous and super-imposed cross movement of the respective sliding rack members.

Figure 6:
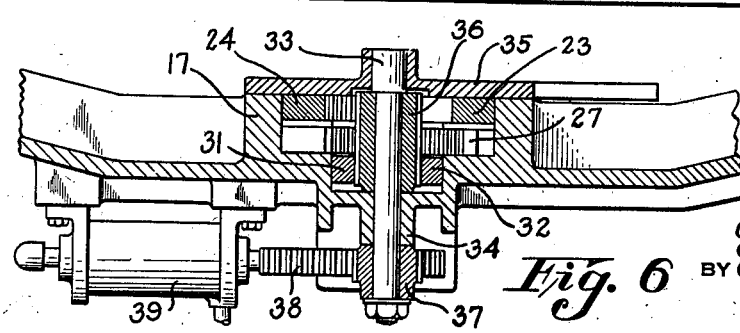
Fig. 6 is an enlarged view of a portion of the centering mechanism, in section, taken on the line VI—VI of Fig. 5.

Forming part of the centering mechanism and contained within the housing 17, is a vertical shaft 33 supported at one end by a bearing 34 (Fig. 6), and at the upper end by a cover plate 35. Rigidly mounted on the shaft 33 within the housing 17 is a gear 36 which is in meshed engagement with the sliding rack members 23, 24, 27, 28, 31, and 32. Keyed to the lower end of the shaft 33 is a second gear 37 in meshed engagement with a rack 38 forming part of the piston rod of the air cylinder 39 secured to the under side of the spider member 16. The travel of the rack member 38 imparts rotary motion to the shaft 33 which, in turn, through the gear 38, functions to cause the sliding members to reciprocate in their respective slots. Located on the outer end of the sliding members and attached thereto are a plurality of tire contacting vertical centering rods 40, 41, 42, 43, 44, and 45 (Fig. 5), which move in and out in conjunction with the respective sliding members.

The means for operating the centering device defined by the numeral 1 is illustrated in Fig. 2. Fluid pressure from a source of supply passes through a conduit 46 to the valve 14. A downward movement of the control handle on the valve 14 permits the fluid pressure to enter conduit 47 leading to the lower end of cylinders 48 and 49 (Figs. 2 and 3), which are mounted vertically on brackets 171 and 172 supported by the base 6. Piston rods 173 and 174, engaging with the cylinders 48 and 49, respectively, are connected at one end to lifting arms 175 and 176 projecting from each end of the spider member 16. The upward movement of the pistons in the cylinders 48 and 49 causes the spider member 16 to be elevated on the shafts 9 and 10, thus bringing the vertical centering rods to a position encircling the tire T resting on the flange 13.

During the upward travel of the spider member 16 a control valve 50 (Fig. 2), positioned at one end of the spider member functions to cause the centering rods to contact the outer periphery of the tire. Attached to one end of the operating lever of the control valve 50 is a contacting roller 51 which during its upward movement engages a link mechanism 52 fastened to a bracket 53 supported by the base member 6. This engagement causes the operating lever of the control valve 50 to be forced downward, thus permitting fluid pressure from a supply line 54 to pass through the valve and enter conduit 55 leading to one end of the cylinder 39, the resulting operation of which has been hereinbefore described. When the contacting roller 51 reaches the end of its engagement with the link mechanism 52, the control valve 50, being of the spring loaded type, reverses its action and permits the fluid pressure to pass through conduit 56 leading to the opposite end of the cylinder 39, causing the centering rods to recede from engagement with the tire. As thus described, the centering mechanism functions to locate the tire in coaxial position relative to its supporting flange 13.

Referring to Fig. 5, a conventional photo-electric cell unit 57 functions to operate a mechanism for clamping the tire T so as to place the base of the tread grooves in a distended condition. Attached to the extreme end of the sliding member 24 is a plate 58 which in its outward position breaks the light beam of the photo-electric cell, but upon inward movement of the plate 58, permits the light beam to close an electrical circuit and through a suitable electrical mechanism, not shown, operate a solenoid valve 59, the action of which is later described.

Referring to Fig. 2, we show a clamping unit, defined by the numeral 2, for holding the tire in operative position. In general, this unit comprises a cross member 60 slidably mounted on shafts 9 and 10. The cross member 60 functions in complementary association with the cross member 11 and is vertically actuated by means hereinafter described. The cross members 11 and 60 are interconnected by two pairs of cylinders 61 and 62 (Figs. 2 and 4), attached at their piston end to lateral projecting arms 63 and 64, respectively, extending from the cross member 60. The opposite ends of the cylinders 61 and 62 are attached to similar projecting arms 65 and 66, respectively, forming part of the cross member 11. The cross member 60 (Fig. 2) has a hub portion 67, centrally located, in which a clamping flange 68 is rotatably mounted for contacting the sidewall portion of the tire. The initial position of the cross members 11 and 60 is such that the pistons in the cylinders 61 and 62 are in extended position and the cross member 11 lowered to that extent.

As the tire is being moved vertically to its clamped position, valve mechanisms are actuated to lower the centering rods to their original starting position. When the cross member 11 is in its lowered position, an arm 69 (Fig. 3), extending therefrom, rests on one end of a bell crank 70 fulcrumed in a bearing 71, supported on an extension of the bracket 15. As the cross member 11 is elevated, a tension spring 72, attached to the opposite end of the bell crank 70, functions to actuate an operating lever 73 of the control valve 14, thus exhausting the fluid pressure in the cylinders 48 and 49, and permitting the spider member 16 (Fig. 5) to return by gravity to its initial position. The operation of the solenoid valve 59, previously referred to and operated by the action of the photo-electric cell unit 57, permits fluid pressure from a source of supply to enter a conduit 74 (Fig. 4), leading to the upper ends of the two sets of cylinders 61 and 62 and elevating the cross member 11 (Fig. 2) carrying the tire properly centered and bringing it into engagement with the clamping flange 58.

Figure 9:
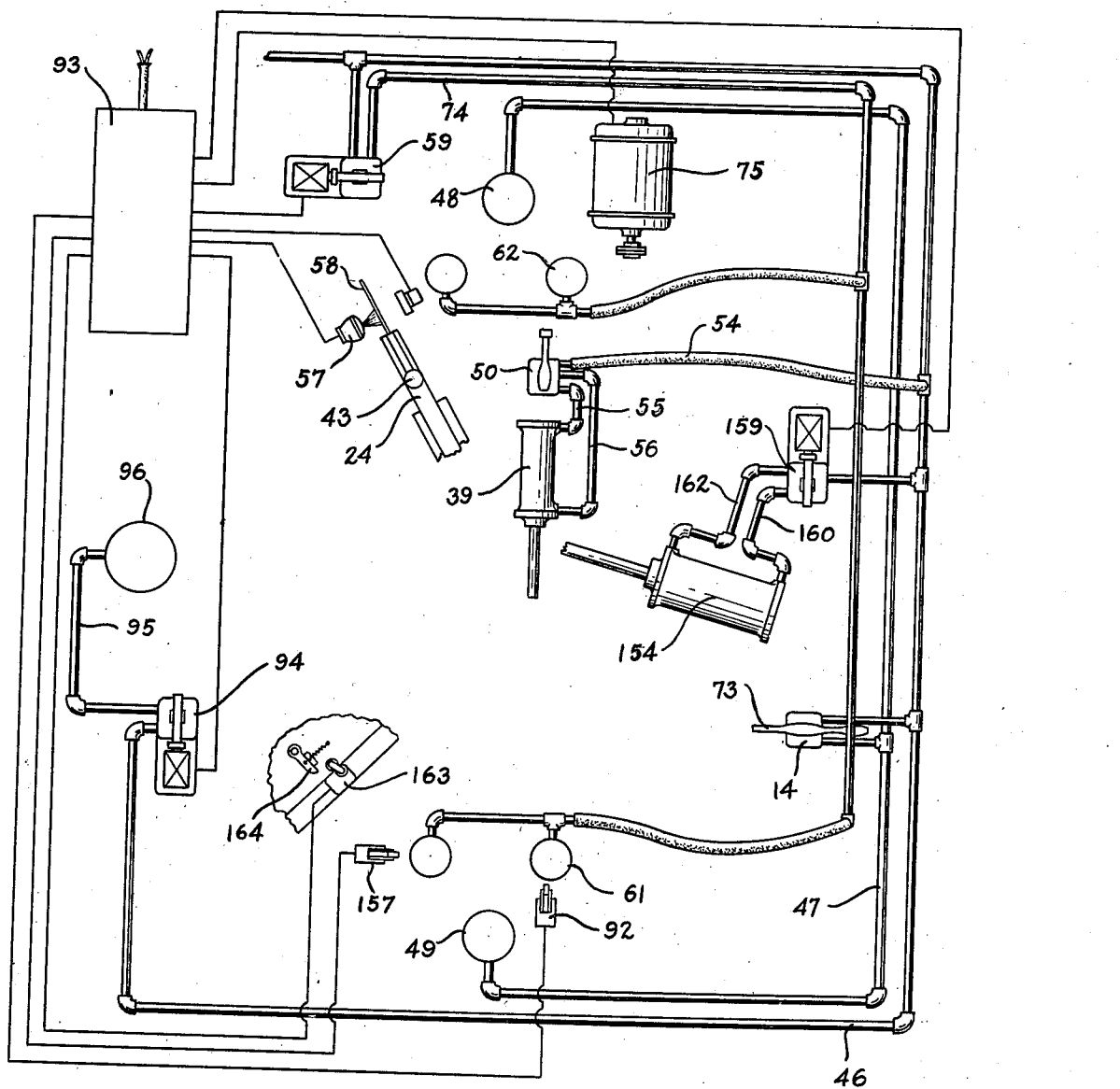
Fig. 9 is a diagrammatic view of fluid and electrical control mechanisms and systems.

The next step in the operation is to provide rotary motion to the clamped tire. This is accomplished by means of a drive unit mounted on the top plate 8 (Figs. 1 and 2), comprising an electric motor 75 driving through a speed reducer 76, a driving sprocket 77, and a chain 78 engaging a driven sprocket 79 mounted on a vertical shaft 80 rigidly supported by the base member 6 and the top plate 8. The vertical shaft 80 is of square cross section to provide rotary driving movement to and slidable with the bushings 81 and 82 (Fig. 2), retained within bearing portions 83 and 84 forming part of the cross members 11 and 60, respectively. Secured to one end of the bushings 81 and 82 are sprockets 85 and 86 which drive sprockets 87 and 88 by means of roller chains 89 and 90, all respectively. The driven sprocket 87 is rigidly mounted on the hub of the clamping flange 68 and the driven sprocket 88 is similarly secured to the tire supporting flange 13. When the clamping flange 68 and the supporting flange 13 are brought together, the tire clamped between the two members is caused to rotate therewith. Automatic means are provided to start the motor 75 at the proper time. This is accomplished by a trip lever 91 (Fig. 2), positioned on the cross member 11 to engage an electric switch 92 attached to the bracket 172 and suitably located to operate at approximately the end of the upward movement required for the clamping action. Conventional intermediate electrical mechanism, not shown, but contained within a control panel 93 (Fig. 9) functions to start the motor 75.

The next step in the sequence of operations is to elevate the clamped tire to a position for the heat treatment of the tire. To accomplish this, the switch 92 (Fig. 2), when caused to function by the action of the trip lever 91 also energizes conventional electrical mechanism contained within the control panel 93 (Fig. 9), for operating a solenoid valve 94 (Fig. 5) located on the base member 6. The action of the valve 94 permits the passage of fluid pressure from a source of supply to enter a conduit 95 leading to the upper end of a cylinder 96 (Fig. 3) vertically situated on the base member 6. The piston rod 177 of the cylinder 96 is forked at one end to receive a cross bar 97 (Fig. 1) and held in place by a pin 98. Both ends of the cross bar 97 are adapted to permit the attachment of end links of two chains 99 and 100 which pass over sprockets 101 and 102, respectively. These sprockets are keyed to a shaft 103 supported in bearings 104 and 105, positioned on the top plate 8. The chains 99 and 100 also engage two additional sprockets 106 and 107 mounted on shafts 108 and 109, supported in bearings 110 and 111, all respectively. The chains 99 and 100 pass vertically through apertures 112 and 113, respectively, cut in the top plate 8, and their ends are attached to suitable connections forming part of the cross member 60. A downward movement of the piston in the cylinder 96 causes the cross members 11 and 60 and the component parts of the clamping unit 2 to be elevated to a position wherein the clamped tire is on a level suitable for the next operation.

Figure 3:
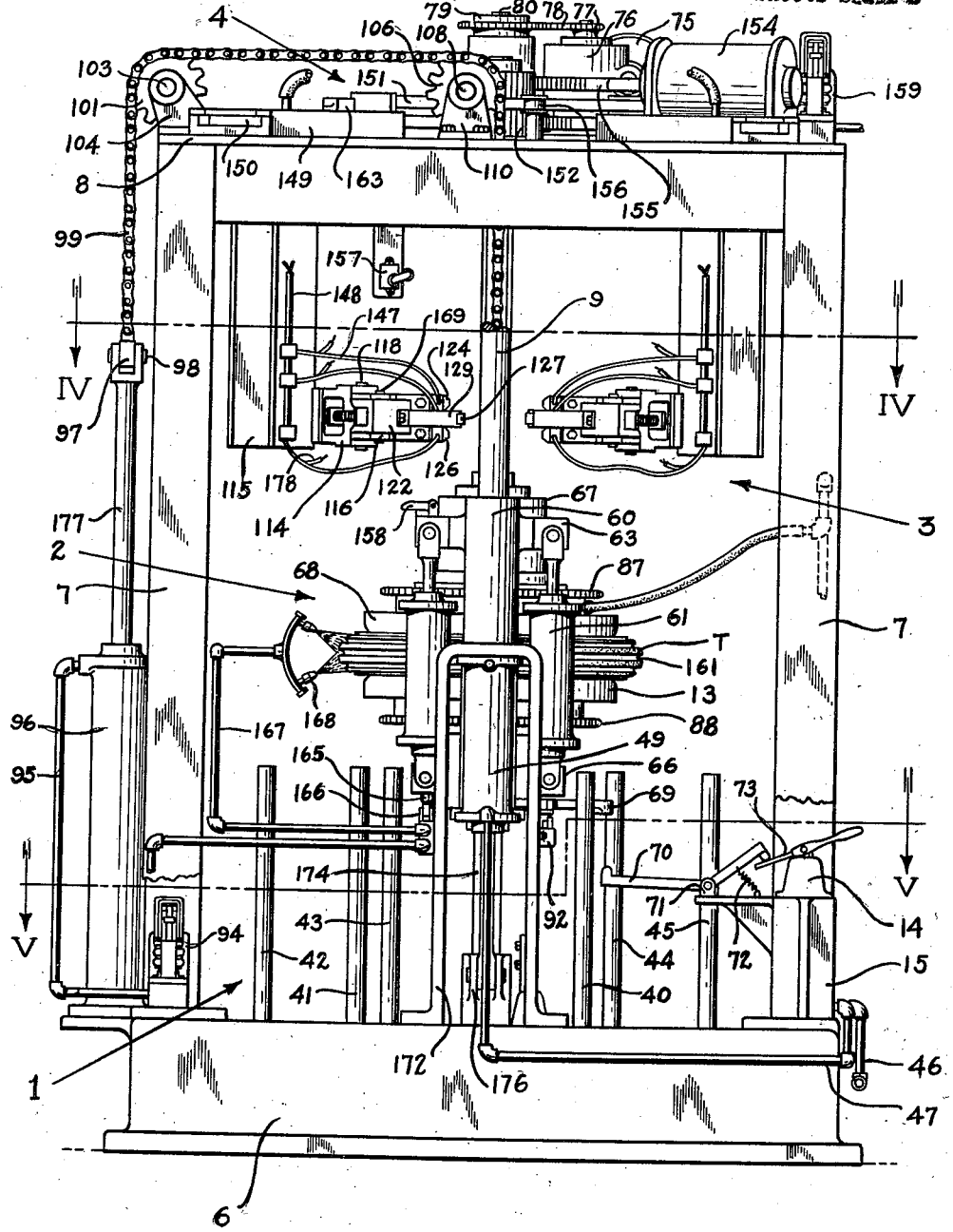
Fig. 3 is a side elevational view of the machine shown in Fig. 1.
Figure 4:
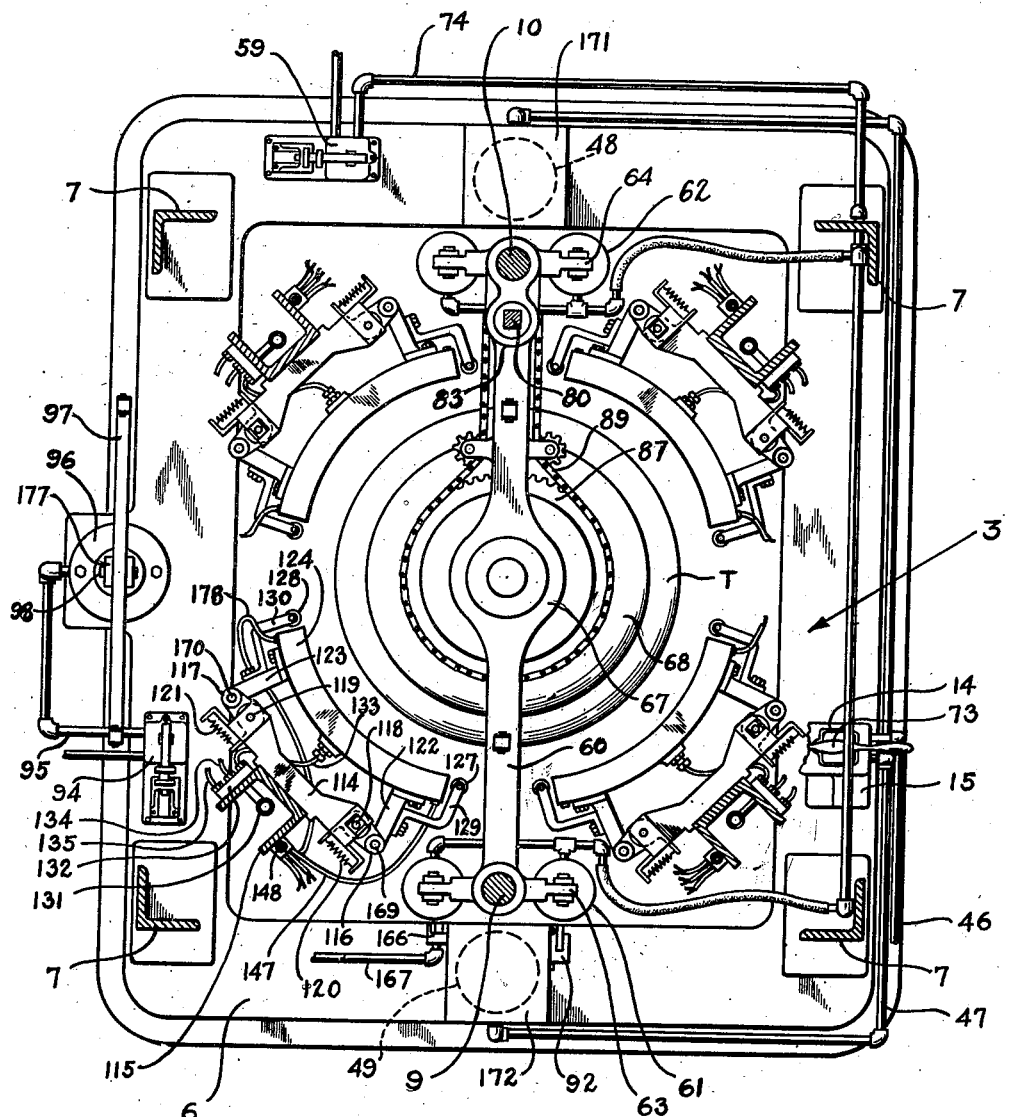
Fig. 4 is a plan view of the machine shown in Fig. 1, partly in section, taken on the line IV—IV of Fig. 3.

Figs. 2, 3, and 4 illustrate the heating units defined by the numeral 3. This mechanism functions to apply super-heated steam to the region of the base of the tread grooves while the tire is clamped in a distorted position. To achieve this end there is provided an arrangement of four steam applying units positioned in radial symmetry, which when caused to move inwardly, by means hereafter described, encircle the greater portion of the outer periphery of the tire but are spaced therefrom a sufficient distance to permit free rotary movement of the tire. As the four heating units are of similar construction, one unit only is described and assigned reference numbers which correspond to similar parts of the remaining units.

Essentially the heating unit comprises a bracket 114 (Fig. 4) rigidly mounted near the lower end of a column 115 suspended from the upper structure or plate 8. Both ends of the bracket 114 are forked to receive pivot members 116 and 117 mounted on pins 118 and 119, respectively. The pivot members 116 and 117 are resiliently associated with compression springs 120 and 121, respectively, which urge the outer ends of the pivot members to move inwardly toward the tire. The extending arms of the pivot members 116 and 117 are adapted to receive connecting members 122 and 123 mounted on pins 169 and 170, respectively.

Supported by the connecting members 122 and 123 are three steam chambers 124, 125, and 126 (Fig. 7) positioned one above the other and of an arcuate shape. It is to be understood that the number of steam chambers can be varied to suit the particular grooves in the tire desired to be treated. As the heating unit is moved in a radial direction toward the tire, rollers 127 and 128 (Fig. 4) engage the outer surface of the tire for controlling the position of the steam chambers with respect to the tire. The rollers 127 and 128 are mounted in brackets 129 and 130 attached to the connecting members 122 and 123, respectively.

Figure 7:
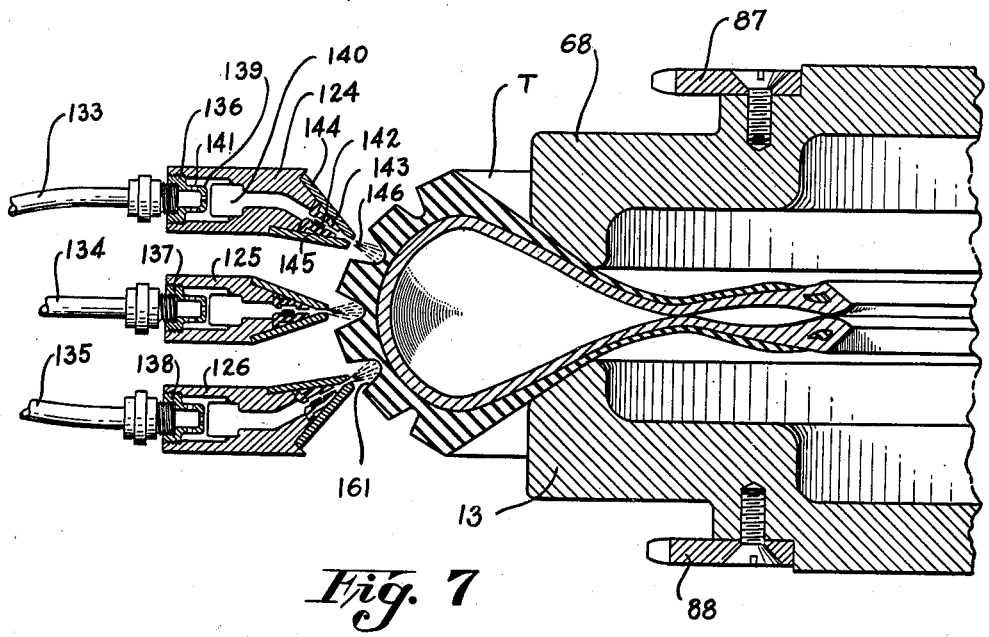
Fig. 7 is an enlarged view, in section, illustrating a heating unit, and showing its relative operating position to a clamped tire.

From a suitable source of supply unsaturated steam passing through a conduit 131, supported on the column 115, enters a manifold 132 having three branch supply lines 133, 134, and 135, leading to and connected with the steam chambers 124, 125, and 126, respectively, (Fig. 7). Located centrally in the steam chambers 124, 125, and 126 are inserts 136, 137, and 138, adapted to receive connections on the end of the supply lines 133, 134, and 135, respectively. Projecting portions 139 on each of the inserts extend into an arcuate cavity 140 within each of the steam chambers. The projecting portions 139 have a plurality of apertures 141 to facilitate the even distribution of the steam throughout the cavity 140. The cavity 140 narrows in width toward the outlet.

Located close to the outlet in each of the steam chambers are electrical heating elements 142 positioned between insulating spacers 143. Removable plates 144 and 145, forming part of each of the steam chambers, are positioned to converge toward the outlet in a direction aimed directly at the base of the adjacent tire groove. At the point where the plates 144 and 145 come together, an opening 146 is provided between each pair of plates, extending practically the entire arcuate distance of the steam chamber. It has been found desirable to maintain the opening 146 about $\frac{1}{32}$ inch wide.

Figure 8:
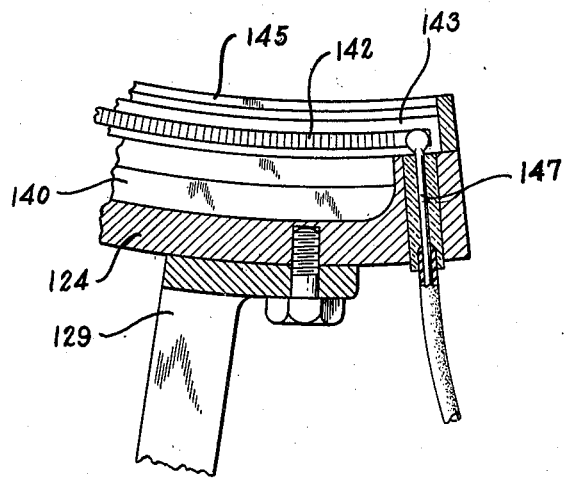
Fig. 8 is a view, in section, of a portion of the heating unit.

The heating elements 142 are a corrugated strip of resistance material commercially known as "chromel metal" and are secured at one end to the conducting wires 147 (Fig. 8) insulated from the steam chambers and leading from an electrically conducting cable 148 (Fig. 4) mounted on the column 115. The opposite end of each element is secured to an electric wire 178 of different potential also leading to the cable 148.

When the steam in its unsaturated state passes through the region of the steam chambers 124, 125, and 126 it is influenced by the heating elements 142 and is converted into heated steam which is ejected at temperatures ranging between 700° and 800° Fahrenheit.

Figure 1:
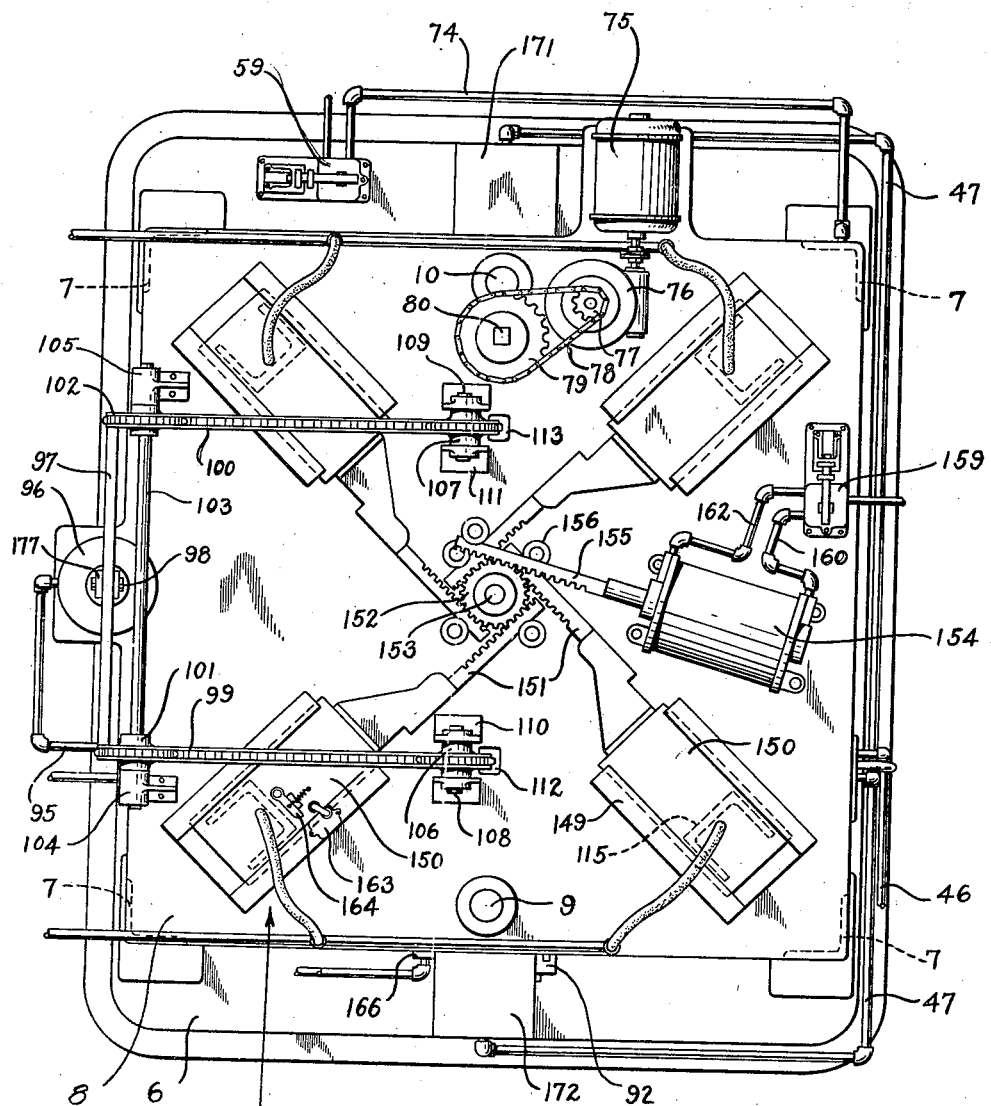
Fig. 1 is a plan view of a machine incorporating our invention.

The mechanism for bringing the heating units simultaneously into operating engagement with the tire comprises the unit 4, shown in particular in Fig. 1. Positioned on the top plate 8 is a plurality of slide members 149. In sliding engagement therewith are plates 150 which form a support for the column 115 and are rigidly attached thereto. Rack extensions 151 on the plates 150 engage a gear 152 mounted on a shaft 153 supported in a central bearing portion of the plate 8. The rack extensions 151 engage the gear 152 in pairs on different planes to permit free movement without obstruction. Disposed between two of the slide members 149 and mounted on the plate 8 is an air cylinder 154. Forming part of the air cylinder piston rod is a rack member 155 which engages the gear 152 on a higher plane than that of the other rack extensions 151. Guide rollers 156 extending from the plate 8 and positioned at suitable heights contact the backs of the rack members to maintain them in complementary engagement with the gear 152.

To actuate the piston in the cylinder 154 there is located under the plate 8 an electric switch 157 (Fig. 3) operated by a trip lever 158 positioned on the projecting arms 63 of the cross member 60. At such time as the clamping unit carrying the tire approaches its maximum upward movement, the trip lever 158 engages the roller on the switch 157 and through conventional electrical mechanism contained within the control panel 93 (Fig. 9) operates to actuate the solenoid valve 159 (Fig. 1) located on the top plate 8. Upon actuation of the valve 159, fluid pressure enters a conduit 160 leading to the back end of the cylinder 154, causing the rack member 155 to move forward, thus rotating the gear 152. Rack extensions 151, also engaging the gear 152, likewise are caused to move inwardly and function to bring the columns 115 which support the heating units into operating engagement with the tire.

In the treatment of a tire, the circumferential grooves 161 (Fig. 7) in the tread portion of the tire, due to the action of the clamping members, become distended. This distension causes the rubber in the base of the grooves to assume a state of tension. Upon the application of high temperature steam ejected from the aperture 146 and directed at the bases of the grooves 161, the tension strains become relieved or neutralized, and when the tire is permitted to return to its normal shape after cooling the rubber in the regions at the bases of the grooves is converted to a state of compression, thus attaining the purpose of the invention.

It has been found that the duration of the steam application necessary to acquire satisfactory results in the case of a passenger car size tire is in the neighborhood of 45 seconds and the clamped tire during this time makes several revolutions. Automatic means for controlling the duration of the treatment are provided in the form of conventional electric timing mechanism contained within the control panel 93 (Fig. 9) and which is set in motion by the closing of a circuit by the action of the switch 157. At a predetermined point of the timing cycle the electric circuit leading to the solenoid valve 159 is opened. This valve being of the spring loaded type functions to permit the fluid pressure to enter the conduit 162, reversing the travel of the rack member 155, thus causing the heating units to move outwardly away from the tire. Both the steam and electrical heating elements utilized in generating the high temperature blast against the bases of the tread grooves are in constant operation throughout the entire period during which the apparatus is being used; that is, this unit is in continuous operation and is not actuated during each cycle of the operation. This provides greater uniformity in temperature control.

In the next cycle of operation the tire is lowered. This is accomplished by means of a switch 163 (Fig. 1) positioned on one of the slide members 149, so that it will engage a trip lever 164 located on the plate 150 at almost the end of the backward movement of the plate. The switch 163 functions through the conventional electrical devices to reverse the action of the solenoid valve 94 (Fig. 3), exhausting the fluid pressure from the cylinder 96 and permitting the clamping unit containing the tire to be lowered by gravity.

To insure setting of the relieved strains in the rubber composition of the tire upon completion of the heat treatment, the tire tread is cooled. When the clamping unit has descended to the limit permitted by the cylinder 96, a cam 165 (Fig. 3), located on the projecting arm 65, engages a water valve 166, permitting the passage of cold water under pressure from a source of supply to enter a conduit 167 leading to spray nozzles 168 directed at the heated portion of the tire. The duration of the cooling operation is controlled by an electric timing device contained within the control panel 93. At a predetermined time the electric circuit leading to the motor 75 is opened, thus causing the tire to stop rotating. The solenoid valve 59 (Fig. 1) is simultaneously actuated permitting the cross member 11 carrying the tire to descend to its starting position. The tire is removed and the machine is ready for a similar cycle of operations.

Briefly, the cycle of operation of the apparatus for treating tires includes the following steps:

Referring to Fig. 2, the flanges 13 and 68 are initially spaced apart to an extent to permit an operator to place a tire T on the flange 13 which provides a horizontal support for the tire. When the tire is thus positioned in an approximate location on the supporting flange 13, the operator manually actuates the valve 14. This action sets the machine in motion and thereafter all of the various machine movements and treatments are automatically controlled.

Actuation of the valve 14 causes the centering rods 40 to 45 inclusive to be moved vertically upwards. Due to this upward movement the valve 50 is caused to be actuated by its association with link mechanism 52, which results in the centering pins moving radially toward the tire mounted on the flange 13, thus locating the tire axially in relation to the flange 13. As the centering pins move inwardly, the photo-electric cell 57 (Fig. 5), associated with one of the centering pins and co-operating with the solenoid valve 59, controls the cylinders 61 and 62, resulting in the flange 13 moving axially toward the flange 68. This movement holds the tire T in a clamped position.

At approximately the end of the upward movement of the centering pins, the roller 51 becomes disengaged from the link mechanism 52, and the valve 50, being spring actuated, causes the centering pins to move radially outward. The start of the upward movement of the flange 13 results in the actuation of the bell crank 70 which, in turn, operates the control lever of the valve 14, causing the centering pins to return to their initial position. As the flange 13 reaches approximately the end of the upward movement, a trip lever 91, associated therewith, engages an electric switch 92 (Fig. 2), which through associated electrical devices within the control panel 93 (Fig. 9), starts the motor 75 (Fig. 2) for rotating the tire.

The electric switch 92 also functions through the control panel 93 to operate the solenoid valve 94 (Fig. 3) for controlling the air cylinder 96 to elevate the flanges 13 and 68 to a position in alignment with the heating units 3. As the flanges 13 and 68 reach the upper limit of their movement, the trip lever 158 (Fig. 3) engages the electric switch 157 which operates the solenoid valve 159 (Fig. 1) associated with the air cylinder 154 and causes an inward movement of the heating units 3. Super-heated steam is ejected from the heating units throughout the operation of the machine, and as the heating units are moved into association with the tire, the steam is directed against the base of the tire grooves.

After a predetermined treatment of the grooves in this manner, as determined by conventional timing devices within the control panel, the heating units 3 are moved radially outward, and in this outward movement the trip lever 164 engages the electric switch 163 which controls the solenoid valve 94, actuating the cylinder 96 and lowering the flanges 13 and 68. At the end of the downward movement of the flanges 13 and 68, a cam 165 (Fig. 3), associated with the flange 13, engages a valve 166, causing a spray of water to be directed against the surface of the tire from the nozzles 168.

After a predetermined water spraying period, during which the tire is cooled, timing devices within the control panel cause the solenoid valve 59 (Fig. 4) to be actuated. This solenoid valve communicates with air cylinders 61 and 62 to permit the flange 13 to be lowered from the flange 68. Simultaneously the timing device within the control panel cuts off the current to the motor 75, whereupon the flange 13 comes to a state of rest, while the operator removes the tire from the flange to complete a cycle of operation.

While we have shown and described a preferred embodiment of our invention, it is to be understood that it is susceptible of those modifications which appear within the spirit of the invention and the scope of the appended claims.

Having thus shown and described our invention, what we claim and desire to protect by Letters Patent is:

1. In an apparatus for treating tires having a tread configuration including grooves, the combination of a support for rotatably positioning a tire on a vertical axis, means for centering the tire on the support, means for clamping the tire on the support to impart tension strains in the region of the bases of the tread grooves, means for elevating the support and the tire axially while maintaining the tire in a clamped position, and means movable radially of the tire in its elevated position for heating the distended bases of the tread grooves.

2. In an apparatus for treating tires having a tread configuration including grooves, the combination of a support for rotatably positioning a tire on a vertical axis, means for centering a tire on the support, means for clamping the tire on the support to impart tension strains in the regions of the bases of the tread grooves, means for elevating the support and the tire axially while maintaining the tire in a clamped position, means movable radially of the tire in its elevated position for heating the distended bases of the tread grooves, and means for cooling the distended bases of the tread grooves.

3. In an apparatus for treating tires having a tread configuration including grooves, the combination of a support for rotatably positioning a tire on a vertical axis, a plurality of guide members movable radially of the tire, means to move said members into and out of contact with the outer periphery of the tire for moving the tire to a central position on the support, means for clamping the centered tire to impart tension strains in the regions of the bases of the tread grooves, means for elevating the support and tire axially while maintaining the tire in its centered clamped position, and means for heating the distended bases of the tread grooves while the tire is in its elevated position.

4. In an apparatus for treating tires having a tread configuration including grooves, the combination of a support for rotatably positioning a tire on a vertical axis, a plurality of vertically disposed rods movable vertically and radially of the tire, means to move said rods toward and away from the tire for first moving the tire to a central position on the support and then clearing it for further operations, means for clamping the tire to impart tension strain in the regions of the bases of the tread grooves, means for elevating the clamped, centered tire, and means for heating the distended bases of the tread grooves in the elevated position of the tire.

5. In an apparatus for treating tires having a tread configuration including grooves, the combination of a support for rotatably positioning a tire on a vertical axis and to engage the sidewall portion of the tire, means for centering the tire on the support, a second support movable vertically and axially relatively to said first support for engaging the opposite sidewall of the centered tire to clamp the tire in its centered position, whereby tension strains are imparted to the region of the bases of the tread grooves, means for elevating said support and the centered tire clamped therebetween while maintaining the tire in clamped, centered position, and means for heating the distended bases of the tread grooves in the elevated position of the tire.

6. In an apparatus for treating tires having a tread configuration including grooves, the combination of a support for rotatably positioning a tire on a vertical axis, means for centering the tire on the support, means for clamping the centered tire to impart tension strains in the regions of the bases of the tread grooves, means for elevating the support axially with the tire clamped thereon in centered position, and a plurality of steam chambers having openings located for directing steam against the bases of the tread grooves of the tire in its elevated and centered position, with said tread grooves clamped under tension.

7. In an apparatus for treating tires having a tread configuration including grooves, the combination of a support for rotatably positioning a tire on a vertical axis, means for centering the tire on the support, means for clamping the tire to impart tension strains in the regions of the bases of the tread grooves, means for elevating the support and tire axially while maintaining the tire in clamped position, a plurality of steam chambers disposed circumferentially about the elevated position of the tire and having openings located for directing steam simultaneously against all of the bases of the tread grooves of the tire, and means for advancing the steam chambers toward the bases of the tire grooves.

8. In an apparatus for treating tires having a tread configuration including grooves, the combination of a support for rotatably positioning a tire on a vertical axis, means for centering the tire on the support, means for clamping the tire to impart tension strains in the regions of the bases of the tread grooves, means for elevating the support and tire axially while maintaining the tire clamped position, a plurality of steam chambers surrounding the elevated position of the tire and having openings located for directing steam against the bases of the tread grooves of the tire, and means for raising the temperature of the steam.

9. In an apparatus for treating tires having a tread configuration including grooves, the combination of a support for rotatably positioning a tire on a vertical axis and to engage the sidewall portion of the tire, a plurality of guide members movable radially of the tire and adapted to contact the outer periphery of the tire for moving the tire to a central position on the support, a second support movable vertically and axially relatively to said first support for engaging the opposite sidewall of the tire to clamp the tire, whereby tension strains are imparted to the bases of the tread grooves, means for elevating the supports to position the tire axially at a heating station, and means at the heating station for heating the distended bases of the tread grooves.

10. In an apparatus for treating tires having a tread configuration including grooves, the combination of a support for rotatably positioning a tire on a vertical axis, a plurality of guide members movable radially of the tire and adapted to contact the outer periphery of the tire for moving the tire to a central position on the support, means for clamping the tire to impart tension strains in the regions of the bases of the tread grooves, means for elevating the support and tire axially to a heating station while maintaining the tire in clamped position, and a plurality of steam chambers located at the heating station, having openings located for directing steam against the bases of the tread grooves of the tire.

11. In an apparatus for treating tires having a tread configuration including grooves, the combination of a support for rotatably positioning a tire on a vertical axis and to engage the sidewall portion of the tire, means for centering the tire on the support, a second support movable vertically and axially relatively to said first support for engaging the opposite sidewall of the tire to clamp the tire, whereby tension strains are imparted to the regions of the bases of the tread grooves, means for elevating said supports with the tire thus clamped and distended to a heating station, and a plurality of segmental steam chambers disposed at said heating station around the elevated tire, having openings located for directing steam against the bases of the tread grooves of the tire, and means co-ordinated with said elevating means for causing said segmental heating chambers to move concentrically toward and away from said grooves.

12. In an apparatus for treating tires having a tread configuration including grooves, the combination of a support for rotatably positioning a tire on a vertical axis, means for centering the tire on the support, means for clamping the tire to impart tension strains in the regions of the bases of the tread grooves, means for elevating the support and tire axially while maintaining the tire in clamped position, means movable radially of the tire for heating the distended bases of the tread grooves, and a spray nozzle located along the vertical path of movement of the tire for directing water against the tire to cool the distended bases of the tread grooves.

13. In an apparatus for treating tires having a tread configuration including grooves, the combination of a support for rotatably positioning a tire on a vertical axis and to engage the sidewall portion of the tire, a plurality of guide members movable radially of the tire and adapted to contact the outer periphery of the tire for moving the tire to a central position on the support, a second support movable vertically and axially relatively to said first support for engaging the opposite sidewall of the tire to clamp the tire, whereby tension strains are imparted to the regions of the bases of the tread grooves, means for elevating the supports with the tire clamped therebetween to a heating station, means at the heating sation for heating the distended bases of the tread grooves, and a spray nozzle located along the vertical path of movement of the tire for directing water against the heated distended bases of the tread grooves to cool the same.

14. In an apparatus for treating tires having a tread configuration including grooves, the combination of a support for rotatably positioning a tire, means for centering the tire on the support, means for clamping the tire on the support to impart tension strains in the region of the bases of the tread grooves, means for advancing the support and the tire in the direction of the axis of the rotatable support while maintaining the tire in a clamped position, and means movable radially of the tire in its advanced position for heating the distended bases of the tread grooves.

OSBORNE B. MOORE.
GLENN G. HAVENS.
GEORGE F. WIKLE.